US010104269B2

(12) United States Patent
Motoyama et al.

(10) Patent No.: US 10,104,269 B2
(45) Date of Patent: Oct. 16, 2018

(54) IMAGE PROCESSING APPARATUS CONFIGURED FOR BINARIZING IMAGE DATA AND METHODS FOR BINARIZING IMAGE DATA

(71) Applicant: BROTHER KOGYO KABUSHIKI KAISHA, Nagoya, Aichi (JP)

(72) Inventors: Toshiki Motoyama, Konan (JP); Shinya Sahara, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/455,248

(22) Filed: Mar. 10, 2017

(65) Prior Publication Data
US 2017/0272609 A1   Sep. 21, 2017

(30) Foreign Application Priority Data
Mar. 18, 2016   (JP) .................. 2016-055847

(51) Int. Cl.
H04N 1/40 (2006.01)
H04N 1/407 (2006.01)
H04N 1/60 (2006.01)

(52) U.S. Cl.
CPC ....... *H04N 1/40012* (2013.01); *H04N 1/4074* (2013.01); *H04N 1/6027* (2013.01); *H04N 1/6072* (2013.01); *H04N 2201/0081* (2013.01)

(58) Field of Classification Search
None
See application file for complete search history.

(56) References Cited

U.S. PATENT DOCUMENTS

| 7,348,991 | B1 * | 3/2008 | Keating | G06F 3/14 345/468 |
| 7,738,727 | B2 * | 6/2010 | Chang | G06T 5/009 358/3.26 |
| 2005/0190121 | A1 * | 9/2005 | An | G09G 3/2007 345/60 |
| 2009/0052774 | A1 * | 2/2009 | Yoshii | G06T 5/009 382/167 |
| 2015/0254865 | A1 * | 9/2015 | Booth | G06T 7/0081 382/237 |

FOREIGN PATENT DOCUMENTS

JP   2009-140244 A   6/2009
JP   2010-016661 A   1/2010

* cited by examiner

*Primary Examiner* — Thomas D Lee
(74) *Attorney, Agent, or Firm* — Scully, Scott, Murphy & Presser, P.C.

(57) ABSTRACT

An image processing apparatus has a storage configured to store image data representing a color image, the image data being constituted by multiple pixels, each of the multiple pixels having a gradation value, and a controller. The controller is configured to extract pixels, from among the multiple pixels, within a specific color range as target pixels, adjust the gradation values of the target pixels such that brightness values of the target pixels are lowered, generate a histogram of index values corresponding to quantities of the brightness values of the multiple pixels constituting the image data after the gradation values of the target pixels are adjusted, set a first threshold value based on the histogram as generated, and apply a binarizing process to the image data using the first threshold value.

19 Claims, 9 Drawing Sheets

IMAGE PROCESSING APPARATUS CONFIGURED FOR BINARIZING IMAGE DATA AND METHODS FOR BINARIZING IMAGE DATA

CROSS-REFERENCE TO RELATED APPLICATIONS

This application claims priority under 35 U.S.C. § 119 from Japanese Patent Application No. 2016-055847 filed on Mar. 18, 2016. The entire subject matter of the application is incorporated herein by reference.

BACKGROUND

Technical Field

The present disclosures relate to an image processing apparatus and an image processing method.

Related Art

A binarizing process is known as one of image processing to be applied to image data. In the binarizing process, each of pixels constituting image data (e.g., multi-value image data) expressed in multi steps (e.g., 256 steps) of gradation expression is converted into a white pixel having a gradation value representing a white color, or a black pixel having a gradation value representing a black color by comparing the value of each pixel with a threshold value. As a result of the binarization of each pixel, image data consisting of white and black pixels (i.e., binarized image data) is generated. The binarizing process may be executed, for example, to reduce the size of the image data, or as a pre-process for a particular image processing (e.g., a character recognition using an OCR function).

Conventionally, in order to obtain good results in the binarizing process, there is known a technique to determine the threshold value to be referred to in the binarizing process based on a histogram of gradation values of respective pixels constituting the image data.

SUMMARY

There has been a case where desired results cannot be obtained according to a conventional binarization technique. An example of such a case is a case where image data is generated by reading, with use of a scanner, an original on which carbon-copied blue characters are formed, or an original including handwritten characters and printed black characters. In many cases, the carbon-copied blue characters or handwritten characters are formed as faint characters on the original. In such a case, when the binarizing process according to the conventional technique is applied, there is a possibility that the pixels corresponding to the blue characters or handwritten characters are converted into white pixels, and the blue characters or the handwritten characters may disappear.

According to aspects of the disclosures, there is provided an image processing apparatus, which has a storage configured to store image data representing a color image, the image data being constituted by multiple pixels, each of the multiple pixels having a gradation value, and a controller. The controller is configured to extract pixels, from among the multiple pixels, within a specific color range as target pixels, adjust the gradation values of the target pixels such that brightness values of the target pixels are lowered, generate a histogram of index values corresponding to quantities of the brightness values of the multiple pixels constituting the image data after the gradation values of the target pixels are adjusted, set a first threshold value based on the histogram as generated, and apply a binarizing process to the image data using the first threshold value.

According to aspects of the disclosures, there is also provided an image processing method for an image processing apparatus which includes a storage configured to store image data representing a color image. The image data is constituted by multiple pixels, each of the multiple pixels having a gradation value. The method includes extracting pixels, from among the multiple pixels, within a specific color range as target pixels, adjusting the gradation values of the target pixels such that brightness values of the target pixels are lowered, generating a histogram of index values corresponding to quantities of the brightness values of the multiple pixels constituting the image data after the gradation values of the target pixels are adjusted, setting a first threshold value based on the histogram as generated, and applying a binarizing process to the image data using the first threshold value.

BRIEF DESCRIPTION OF THE ACCOMPANYING DRAWINGS

DETAILED DESCRIPTION OF THE ILLUSTRATIVE EMBODIMENTS

A. First Embodiment

A-1. Configuration of Image Processing System

Figure 1:
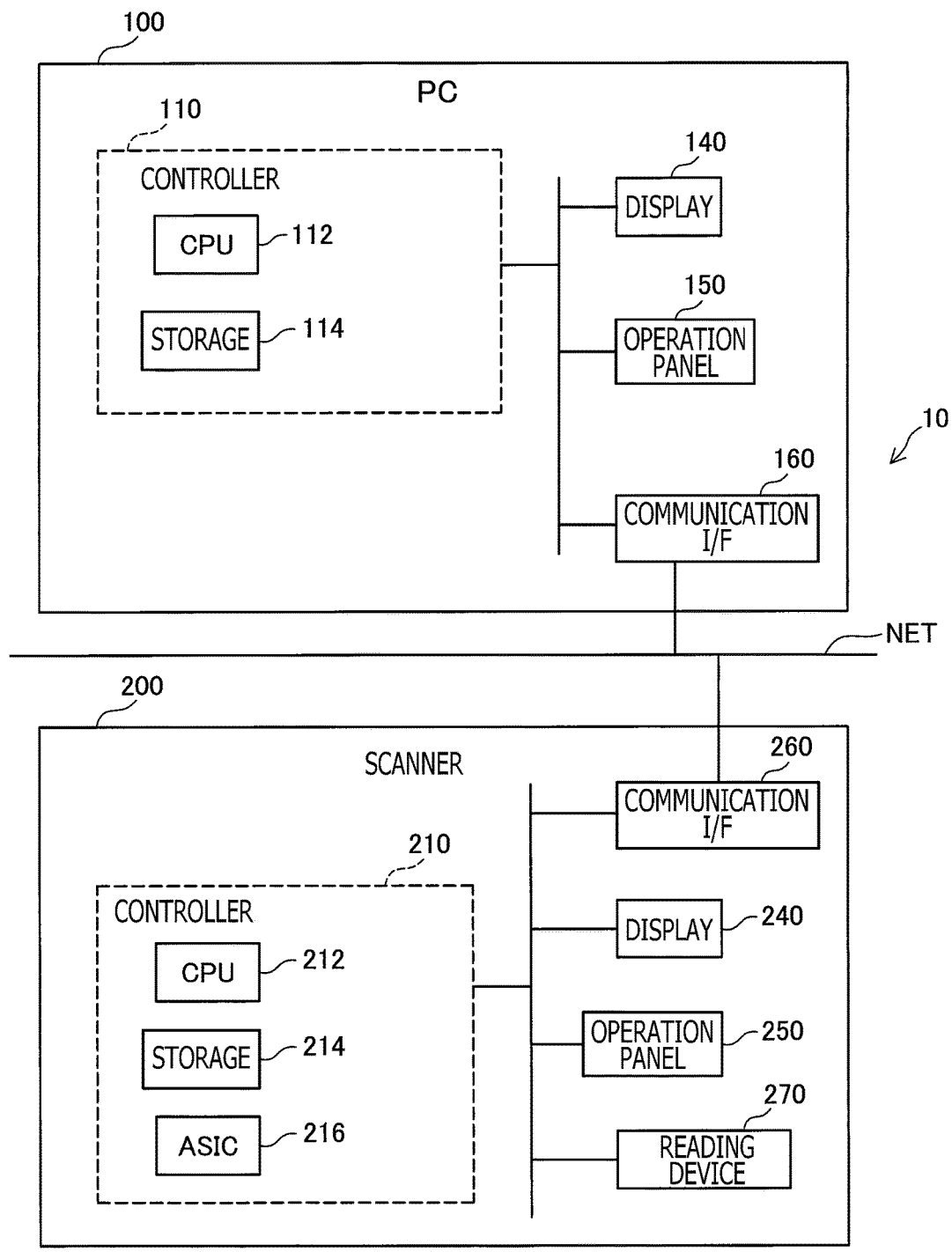
FIG. 1 is a block diagram showing a configuration of an image processing system according to a first illustrative embodiment of the disclosures.

FIG. 1 shows a configuration of an image processing system 10 according to an illustrative embodiment of the disclosures. The image processing system 10 has a scanner 200 configured to read an image on an original and generates image data representing the read image, and a personal computer (hereinafter, referred to as a PC) 100 configured to control operations of the scanner 100. The PC 100 and the scanner 200 are connected through, for example, a network NET, so that a data communication can be executed therebetween. It is noted that the scanner 200 is an example of an image processing apparatus.

The PC 100 includes a controller 110, a display 140, an operation panel 150, a communication I/F 160, which are interconnected through a bus or the like. The controller 110 includes a CPU (central processing unit) 112 and a storage 114.

The operation panel 150 of the PC 100 has, for example, a mouse and a keyboard (not shown) with which a user can input instructions to the PC 100. The display 140 includes, for example, an LCD (liquid crystal display) and displays various screens. The communication I/F 160 is hardware configured to communicate with the scanner 200 and/or other equipment in accordance with a wired or wireless communication method.

The storage 114 of the PC 100 includes a ROM (read only memory) and a RAM (random access memory), and stores various programs and/or serves as a work area when the programs are executed and a temporary storage area to temporarily store data during execution of the programs. According to the illustrative embodiment, the storage 114 includes, at least, a scanner driver which is software controlling operations of the scanner 200. As the CPU 112 executes the programs retrieved from the storage 114, various functions of the controller 110 are realized.

The scanner 200 includes a controller 210, a display 240, an operation panel 250, a communication I/F 260 and a reading device 270, which are interconnected through a bus or the like. The controller 210 includes a CPU 121, a storage 214 and an ASIC (application specific integrated circuit) 216.

The reading device 270 of the scanner 200 is an image sensor configured to read the original in accordance with a contact sensor type reading method or an optical reduction type reading method. The display 240 includes, for example, an LCD and displays various setting screens and/or operation states of the scanner 200. The operation panel 250 is provided with multiple buttons (not shown) to receive user's instructions. It is noted that the operation panel 250 may be a touch panel overlaid on a displaying face of the display 240. The communication I/F 250 is hardware configured to communicate with PC 100 and other equipment in accordance with the wired or wireless communication method.

The storage 214 of the scanner 200 includes a ROM storing various programs, and a RAM used as a work area when the CPU 212 executes the programs and/or a temporary storage for data which is generated when the CPU 212 executes the programs. The CPU 212 is configured to execute particular operations in accordance with programs retrieved from the storage 214. The ASIC 216 is a hard circuit configured to process image data. The controller 210 including the above components realizes various functions.

Figure 2:
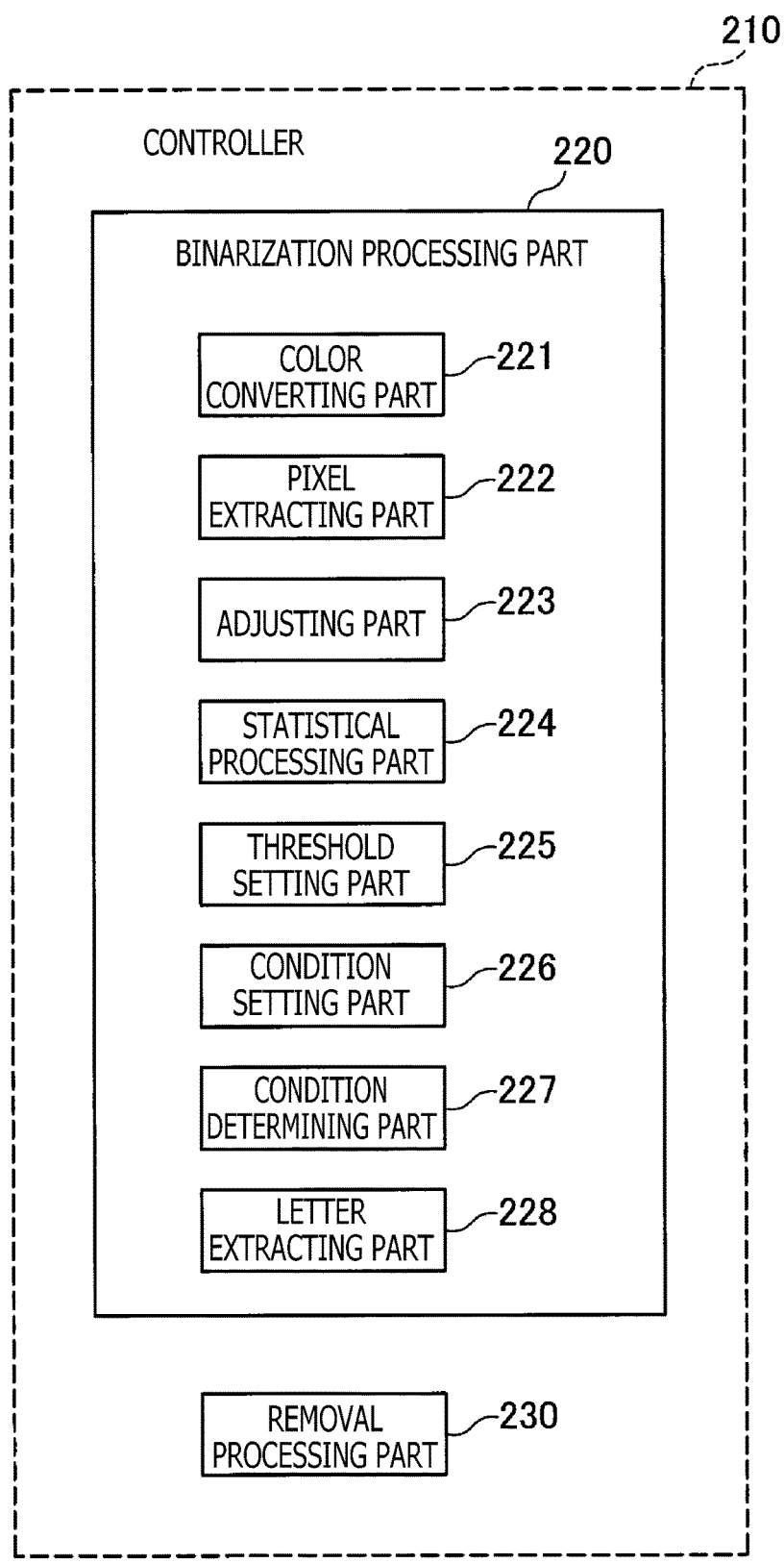
FIG. 2 is a block diagram showing functions realized by a controller of a scanner according to the illustrative embodiment of the disclosures.

FIG. 2 is a block diagram schematically illustrating functions realized by the controller 210 of the scanner 200. The controller 210 serves as a binarization processing part 220 and a removal processing part 230. Further, the binarization processing part 220 includes a color converting part 221, a pixel extracting part 22, an adjusting part 223, a statistical processing part 224, a threshold setting part 225, a condition setting part 226, a condition determining part 227 and a letter extracting part 228. Functions of respective parts mentioned above will be described below.

A-2. Binarizing Process

The scanner 200 according to the first illustrative embodiment is configured to execute the binarizing process. In the binarizing process, each of pixels constituting image data (e.g., multi-value image data) expressed by multi steps (e.g., 256 steps) of gradation expression is converted into a white pixel having a gradation value representing a white color or a black pixel having a gradation value representing a black color by comparing the value of each pixel with a threshold value. As a result of the binarization of each pixel, image data consisting of white and black pixels (i.e., binarized image data) is generated. The binarizing process may be executed, for example, to reduce the size of the image data, or as a pre-process for a particular image processing (e.g., a character recognition using an OCR function).

Figure 3:
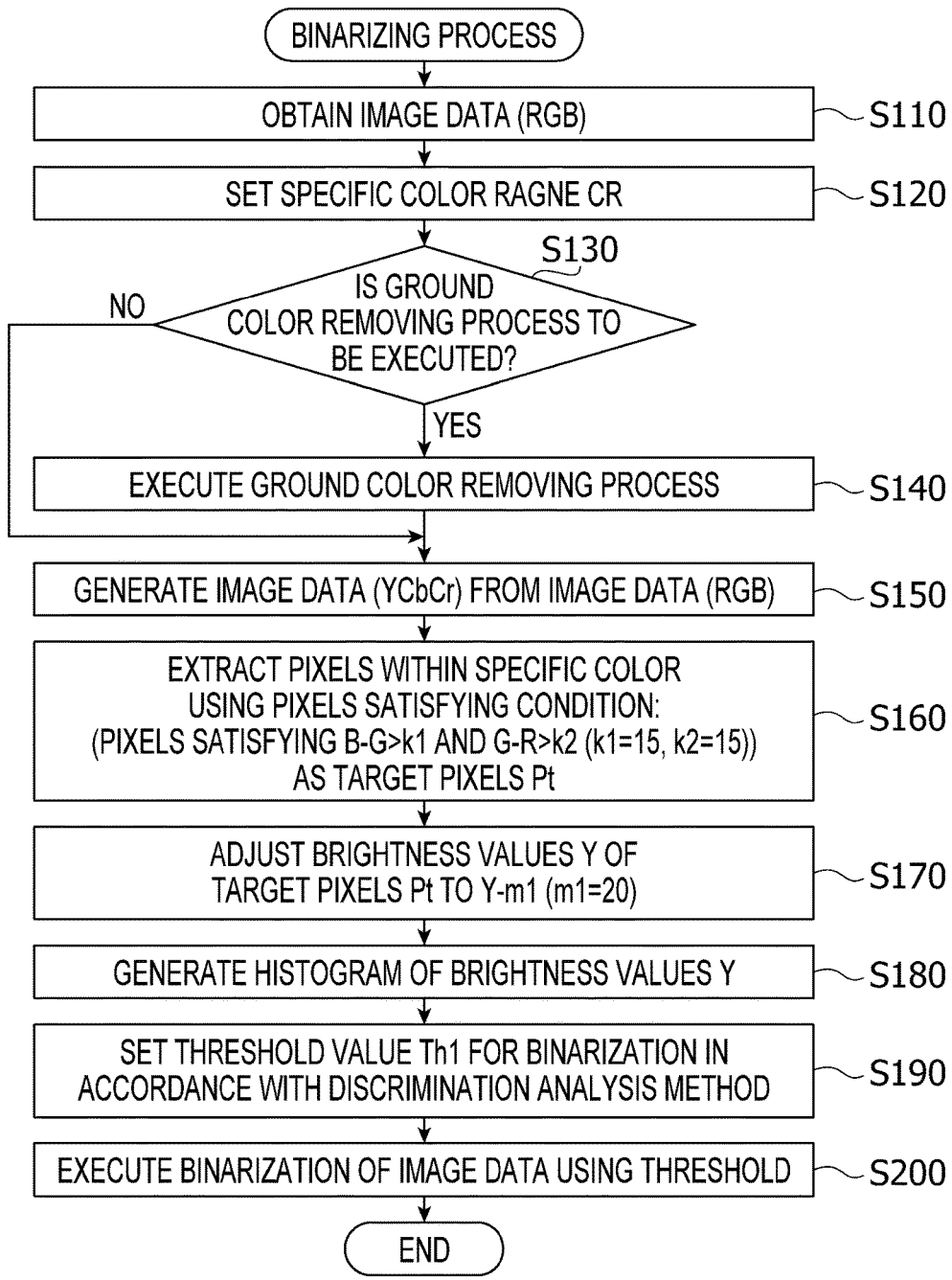
FIG. 3 is a flowchart illustrating a binarizing process according to the first illustrative embodiment of the disclosures.

FIG. 3 is a flowchart illustrating the binarizing process according to the first illustrative embodiment. Further, FIGS. 4A-4F illustrate concrete examples of the binarizing process. When an instruction to execute the binarizing process is input from the PC 100 through the communication I/F 260, or such an instruction is input through the operation panel 250 of the scanner 250, the binarizing process is started.

When the binarizing process is started, the binarization processing part 220 of the scanner 200 (see FIG. 2) obtains image data to which the binarizing process (hereinafter, such data will be referred to as target image data) is to be applied (S110). According to the first illustrative embodiment, image data, which is generated as the original PA is read by the reading device 270 (see FIG. 1) of the scanner 200, is obtained as the target image data IF. It is noted that, according to the first illustrative embodiment, the target image data IF is so-called full color RGB data which is configured such that each of R (red), G (green) and B (blue) components are represented by 256-step (i.e., 8-bit) gradation values (0-255). It is noted that, in the following description, the R component, the G component and the B component of each pixel may occasionally be expressed as R, G and B, respectively. So are components Y, Cb and Cr, which will be described later.

Figure 4A:
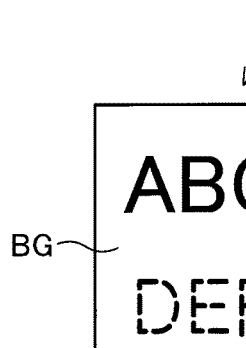
FIGS. 4A-4F illustrate examples of the binarizing process according to the first illustrative embodiment.

FIG. 4A shows an example of the target image data IF. It is noted that the example shown in FIG. 4A represents the image data which is generated as the reading device 270 reads the original PA (e.g., a sales slip or a receipt), which includes black letters CHk, and blue letters CHb formed with use of a blue carbon paper on a white background BG. It is noted that, although the blue letters CHb are indicated with broken lines in FIG. 4A, the letters CHb are actually ones written with slid lines.

Next, the pixel extracting part 222 sets the specific color range CR (S120). The specific color range CR is a range of the color subject to an adjusting process (S170) in which the brightness value Y is adjusted so that the pixels are likely to be converted to black pixels rather than white pixels in the binarizing process of the target image data IF.

According to the first illustrative embodiment, the pixel extracting part 222 sets the specific color range CR based on at least one of a size of the target image data IF and a size of the original PA from which the target image data IF is generated. It is noted that, in this specification, the "size" of the image data means a data capacity of the image data, and the "size" of the original PA means a dimension of the original PA in a vertical or a horizontal direction, or an aspect ratio of the original PA.

For example, in the binarizing process of the target image data IF, which is generated as the reading device 270 reads the originals such as sales slips or receipts which may very likely be generated using the blue carbon paper, it is frequently desired that the pixels corresponding to the blue letters CHb are converted to the black pixels, but not the white pixels (that is, the blue letters CHb remain, but not disappear).

As a result, in cases where the size of the original PA from which the target image data IF is generated corresponds to a particular size defined as the size of the sales slips or the receipt, where the size of the target image data IF corresponds to a particular size defined as the size of the image data which is generated as the sales slips or the receipt are read at a particular resolution, the pixel extracting part 222 sets a blue color range, which is defined by formula F(1) below, as the specific color range CR.

$$B-G>k1, \text{ and } G-R>k2 \qquad \qquad F(1)$$

where, k1 and k2 are constants, and k1=15 and k2=15, for example.

Hereinafter, description will be continued on assumption that the blue range defined above is set as the specific color range CR.

Next, the binarization processing part 220 determines whether a ground color removing process is to be executed (S130). The ground color removing process is a well-known process to convert the gradation values of the pixels, which correspond to the ground color (i.e., the color of the sheet of the original, the background color of an image, and the like), from among multiple pixels constituting the image data to the values corresponding to the white color. It is noted that the binarization processing part 220 may determine whether the ground color removing process based on a particular setting, or may determine based on an instruction input through the operation panel 250. Alternatively, the binarization processing part 220 may determine whether the ground color is white or not by analyzing the target image data IF, and determine to execute the ground color removing process when it is determined that the ground color is not white.

When it is determined that the ground color removing process is to be executed (S130: YES), the binarization processing part 220 causes the removal processing part 230 (see FIG. 2) to apply the ground color removing process to the target image data IF (S140). When it is determined that the ground color removing process is not to be executed (S130: NO), the binarization processing part 220 skips S140.

Next, the color converting part 221 generates YCbCr data from the target image data IF (RGB data) in S150. The YCbCr data is image data representing the color of each pixel with a brightness value Y and two color degrees (color difference components) of Cb (yellow-blue) and Cr (red-green). The YCbCr data is generated from the target image data IF in accordance with, for example, formulae F(2)-F(4) below. According to the first illustrative embodiment, the brightness value Y is expressed as a 256-step gradation value of which range is from 0 to +255, while each of the color difference components Cb and Cr is expressed as a 256-step gradation value of which range is from −127 to +128.

$$Y=0.299R+0.587G+0.114B \qquad \qquad F(2)$$

$$Cb=-0.169R-0.331G+0.500B \qquad \qquad F(3)$$

$$Cr=0.500R-0.419G-0.081B \qquad \qquad F(4)$$

Next, the pixel extracting part 222 extracts pixels included within the specific color range CR, from among the multiple pixels constituting the target image data IF, as the target pixels Pt (S160). Specifically, the pixel extracting part 222 extracts the pixels corresponding to the formula F(1) above (i.e., the blue pixels) as the target pixels Pt.

Next, the adjusting part 223 executes an adjusting process to lower the brightness values Y of the extracted target pixels Pt (S170). Specifically, the adjusting part 223 applies a conversion defined by formula F(5) below to the brightness values Y. That is, the adjusting part 223 subtracts a particular constant m1 from the brightness value Y before conversion. Hereinafter, the thus converted brightness values will be referred to as adjusted brightness values Ya.

$$Ya=Y-ma \qquad \qquad F(5)$$

where, m1 is a constant (e.g., m1=20).

Next, the statistical processing part 224 generates a histogram of the brightness values Y of the target image data IF (S180). In this case, with respect to the target pixels Pt from among the pixels constituting the target image data IF, the adjusted brightness values Ya will be used.

Figure 4B:
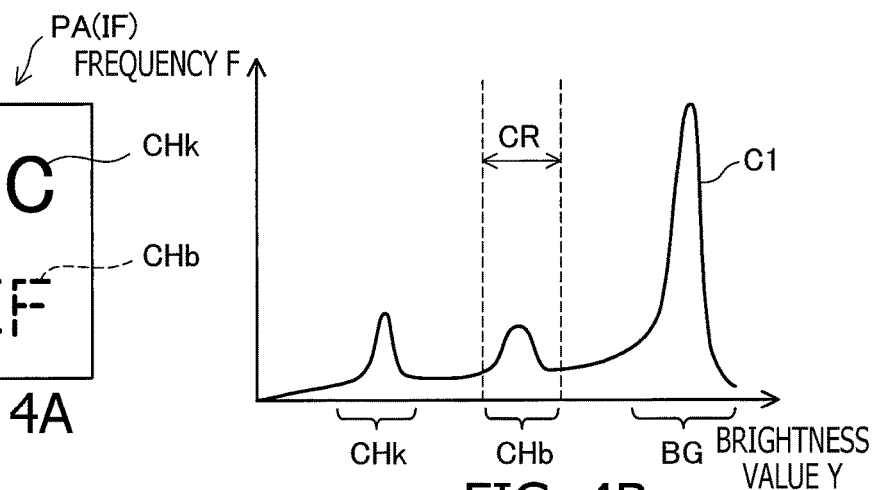

FIG. 4B shows an example of the histogram of the brightness values Y of the target image data IF before adjustment. It is noted that FIG. 4B shows a frequency curve C1 connecting frequencies F for respective brightness values Y. In the example shown in FIG. 4B, the frequency curve C1 has three peaks which respectively correspond to the white background BG, the black letters CHk and the blue letters CHb.

Figure 4C:
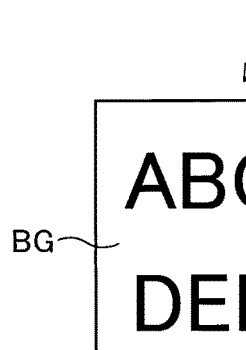
Figure 4D:
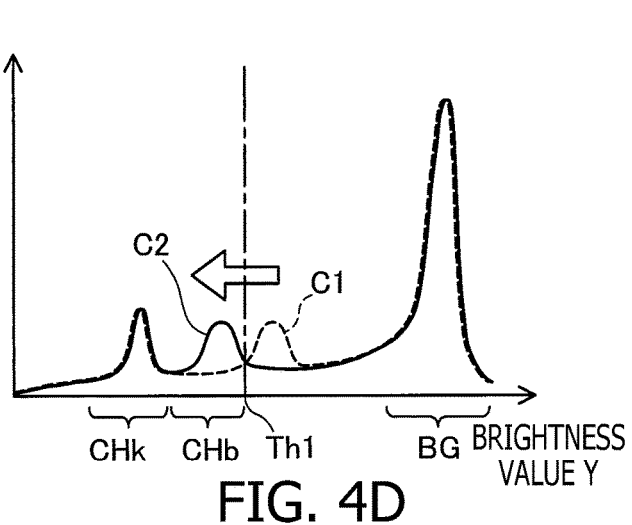

FIG. 4D shows an example (i.e., a frequency curve C2) of the histogram of the brightness value Y of the target image data IF after adjustment. The frequency curve C2 after adjustment is formed such that the brightness values Y of a part of the pixels within the specific color range CR in the frequency curve C1 (e.g., the pixels at the blue letters CHb) is shifted leftward (i.e., on a side at which the brightness value Y is smaller).

Next, based on the histogram of the brightness values Y after adjustment as generated, the threshold setting part 225 sets a threshold for the binarizing process (hereinafter, referred to as a first threshold value Th1) in S190. It is noted that setting of the first threshold value Th1 is executed based on, for example, a discrimination analysis method known as Otsu method. The discrimination analysis is a method in which a threshold value A is varied from the minimum brightness value to the maximum brightness value in the brightness histogram, and determine the threshold value A at which a ratio of in-class variance to inter-class variance of two classes divided by the threshold value A becomes the largest as the threshold (i.e., the first threshold value Th1) used for the binarizing process. In FIG. 4D, the first threshold value Th1 as set is indicated as an example.

Next, the binarization processing part 220 applies the binarizing process to the target image data IF using the first threshold value Th1 as set, thereby generating the binarized image data IB (S200). Specifically, the binarization processing part 220 converts, from among the multiple pixels constituting the adjusted target image data IF, ones of which brightness values (or, adjusted brightness values Ya for the target pixels Pt) are equal to or less than the first threshold value T1 to the black pixels, while ones of which brightness values are higher than the first threshold value Th1 to the white pixels. It is noted that, according to the first illustrative embodiment, the binarized image data IB is generated as the RGB data similarly to the target image data IF, the gradation values of the black pixels are (R, G, B)=(0, 0, 0), while the gradation values of the white pixels are (R, G, B)=(255, 255, 255).

In the histogram of the brightness values Y shown in FIG. 4D, the pixels distributed on the left side with respect to a line indicating the first threshold value Th1 are converted to the black pixels, while the pixels distributed on the right side with respect to the line indicating the first threshold value Th1 are converted to the white pixels. It is noted that the brightness values Y of the pixels at a portion of the blue letter CHb in the target image data IF is shifted leftward with respect to the first threshold value Th1. Therefore, as shown in FIG. 4C, the blue letters CHb within the target image data IF remain as the black letters CHk, but not being deleted in the binarized image data IB.

Figure 4E:
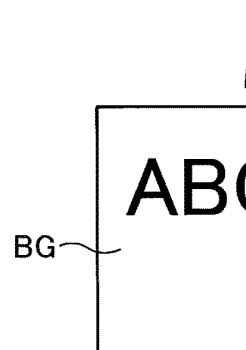
Figure 4F:
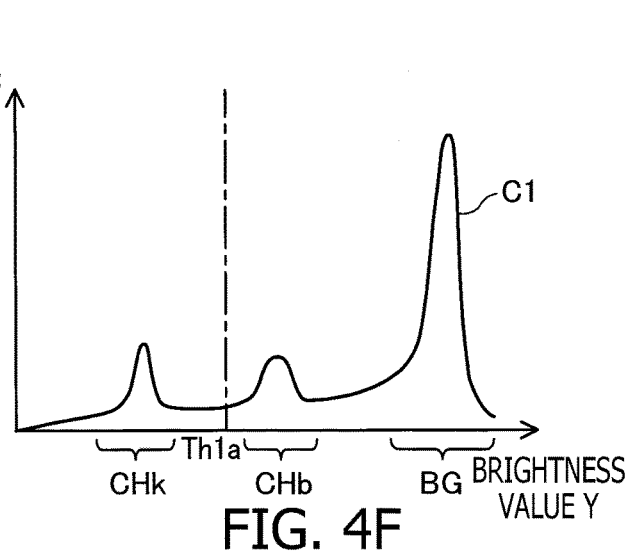

It is noted that, if the above adjustment process is not executed, the brightness values Y of the pixels at the portion of the blue letters CHb in the target image data IF are converted to the white pixels in the binarizing process since the brightness values Y of the pixels at the portion of the blue letters CHb are distributed on the right side with respect to the threshold value Th1$a$ (which is not equal to the first threshold value Th1) for the binarizing process which is set based on the frequency curve C1. As a result, if the above-described adjustment process is not executed, the blue letters CHb in the target image data IF disappear in the binarized image data IB $a$ as shown in FIG. 4E.

As described above, in the binarizing process according to the first illustrative embodiment, the pixel extracting part 222 of the scanner 200 extracts the pixels within the specific color range CR as the target pixels Pt from among the multiple pixels constituting the target image data IF representing a color image, the adjusting part 223 executes the adjusting process to lower the brightness values Y of the target pixels Pt, the statistical processing part 224 generates the histogram of the brightness values Y (adjusted brightness values Ya) of the multiple pixels constituting the target image data IF after adjusted, the threshold setting part 225 sets the first threshold value Th1 based on the generated histogram, and the binarization processing part 220 applies the binarizing process to the target image data IF using the first threshold value Th1.

Because of the above configuration, it is more likely that the pixels within the specific color range CR are converted to the black pixels but not to the white pixels when the binarizing process is applied. For example, by setting a blue range as the specific color range CR, it becomes more likely that the blue letters CHb in the target image data IF remain as the black letters CHk in the binarized image data IB which is generated in the binarizing process. Therefore, with use of the scanner 200 according to the first illustrative embodiment, it is possible to suppress occurrence of a situation in which a desired result cannot be obtained, or letters or images to be remained disappear.

Further, in the binarizing process by the scanner 200 according to the first illustrative embodiment, the pixel extracting part 222 sets the specific color range CR based on at least one of the size of the target image data IF and the size of the original PA from which the target image data IF is generated. For example, the image extracting part 222 sets the above-described blue range as the specific color range CR when the size of the target image data IF or the size of the original PA corresponds to a particular size corresponding to the payment slip or receipt which may likely be generates with use of the blue carbon paper. As a result, with the scanner 200 according to the first illustrative embodiment, the specific color range CR can be set appropriately in accordance with the size of the target image data IF, it is possible to effectively suppress occurrence of a situation in which a desired result cannot be obtained in the binarizing process.

Furthermore, in the binarizing process by the scanner 200 according to the first illustrative embodiment, when the removal processing part 230 executes the ground color removing process (FIG. 3, S410), the pixel extracting part 222 executes extraction of the target pixels Pt using the target image data IF after the ground removing process has been applied thereto. Because of such a configuration, with the scanner 200 according to the first illustrative embodiment, it is possible to suppress a situation where the pixels having the ground color in the target image data are unintentionally subjected to the adjusting process as included in the specific color range CR. As a result, with the scanner 200 according to the first illustrative embodiment, it is possible to suppress a situation where the pixels having the ground color remain in the binarized image data IB generated in the binarizing process as the black pixels in the binarized image data IB as the target image data.

A-3. Modification of First Illustrative Embodiment

Figure 5:
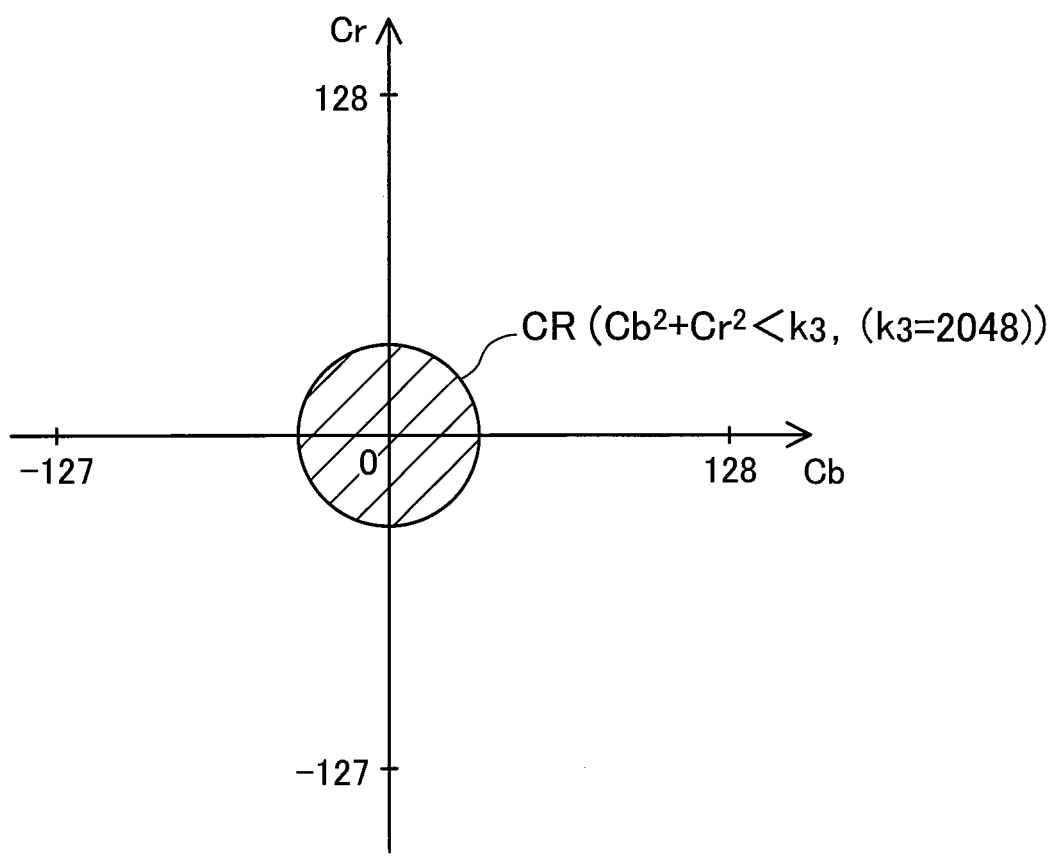
FIG. 5 illustrates a specific color range of a color which is close to an achromatic color.

In the first illustrative embodiment, a case where the blue range is set as the specific color range CR is described. It should be noted that the specific color range CR need not be limited to the blue range. For example, a range of the color which is close to the achromatic color may be set to the specific color range CR. Specifically, as the specific color range CR, a range defined by formula F(6) below may set. Such a specific color range CR is, as shown in FIG. 5, a range inside a circle when a horizontal axis represents a color difference Cb, while a horizontal axis represents a color difference CR. It is noted that the left side of formula F(6) is an example of an index value indicating a chroma saturation, while constant k3 on the right side of formula F(6) is an example of ninth threshold value.

$$Cb^2+Cr^2<k3 \qquad \qquad F(6)$$

where, k3 is constant (e.g., k3=2048).

For example, in the binarizing process of the target image data which is generated as the original (e.g., the payment slip or the receipt) including printed black letters and handwritten letters thinner (e.g., gray) than printed black letters on the white background is read by the reading device 270, it is generally desired that the pixels at a portion of the handwritten letters are converted to the black pixels (i.e., remained, without disappearing). In the binarizing process of such target image data IF, if a range of the color close to the achromatic color is set as the specific color range CR, it becomes likely that relatively thin handwritten letters in the target image data IF remain as black letters in the binarized image data IB. Therefore, it becomes possible to suppress occurrence of a situation where the desired result cannot be obtained.

B. Second Illustrative Embodiment

Figure 6:
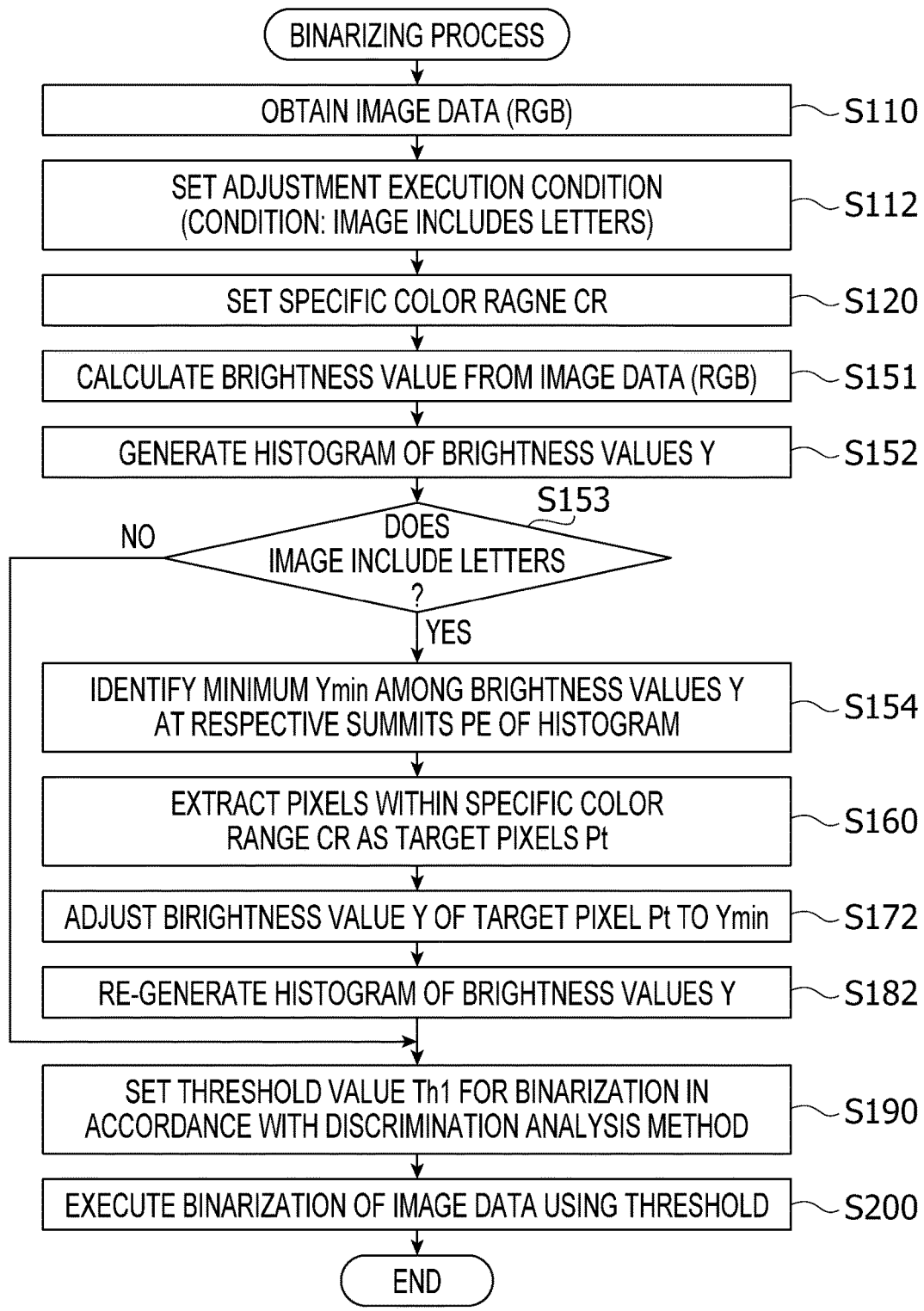
FIG. 6 is a flowchart illustrating a binarizing process according to a second illustrative embodiment of the disclosures.

FIG. 6 is a flowchart illustrating the binarizing process according to a second illustrative embodiment. In the following description, steps of the binarizing process according to the second illustrative embodiment which are similar to those of the binarizing process according to the first illustrative embodiment are assigned with the same step numbers and description thereof will occasionally be omitted.

In the binarizing process according to the second illustrative embodiment, similar to the first illustrative embodiment, the condition setting part 226 (see FIG. 2) of the scanner 200 sets the adjustment execution condition (S112) after the target image data IF is obtained (S110). The adjustment execution condition is a condition to be used to determine whether adjusting process (S172) is to be applied to the target pixels Pt.

According to the second illustrative embodiment, the condition setting part 226 sets the adjustment execution condition based on at least one of the size of the target image data and the size of the original PA from which the target image data IF it to be generated. For example, the condition setting part 226 may set a condition that "the image represented by the target image data IF includes letters" as the adjustment execution condition when the size of the target image data IF or the size of the original PA from which the target image data IF is generated corresponds to particular sizes defined in advance as those of the payment slip or receipt. The following description will be made under assumption that the condition, "the image represented by the target image data IF includes letters" has been set.

Next, as in the first illustrative embodiment, after the specific color range CR is set (S120), the color converting part 221 calculates the brightness value Y of each pixel based on the target image data IF (S151). It is noted that calculation of the brightness value Y may be done with use of, for example, formula F(2) described above.

Next, the statistical processing part 224 generates a histogram of the calculated brightness values Y (S152). Then, the condition determining part 227 causes the letter extracting part 228 to execute a process to extract letters from the image represented by the target image data IF, and determines whether the image represented by the target image data IF includes letters based on the previous process (i.e., determines whether the adjustment execution condition is satisfied) in S153.

It is noted that when a frequency of the pixels corresponding to a relatively high brightness value Y (i.e., pixels assumed to correspond to the ground color or background) is equal to or higher than a threshold value, and a frequency of the pixels corresponding to a relatively low brightness value Y (i.e., pixels assumed to correspond to letters) is equal to or greater than another threshold, the letter extraction part 228 extracts the pixels corresponding to the relatively low brightness value Y as the pixels of the letters.

It is noted that the letter extraction process by the letter extracting part 228 can be realized by other well-known methods. For example, the letter may be extracted by inspecting edge pixels in the image, or with use of an OCR function. When letter pixels are extracted by the letter extracting part 228, the condition determining part 227 determines that letters are include in the image represented by the target image data IF, while, when the letter pixels are not extracted by the letter extracting part 228, the condition determining part 227 determines that no letters are included in the image represented by the target image data IF.

When it is determined that the letters are included in the image represented by the target image data IF (i.e., when it is determined that the adjustment execution condition is satisfied) (S153: YES), the adjusting process is executed. Specifically, the binarization processing part 220 initially detects peaks PE from the histogram of the brightness value Y, and identifies a minimum value Ymin among the peaks PE (S154). The minimum value Ymin is assumed to be the lowest brightness value Y among the brightness values Y in the letter area included in the image represented by the target image data IF. It is noted that a peak in the histogram of the brightness value Y represents a point toward which the frequency of the brightness values Y continuously increases by a particular number in a direction where the brightness values Y increase, and from which point the frequency continuously decreases by a particular number. In order to improve detection accuracy of the peaks PE, a pre-process such as a process to calculate a moving average of the histogram of the brightness values Y may be executed before detection of the peaks PE.

Next, as in the first illustrative embodiment, after the extraction of the target pixels Pt included within the specific color range CR is executed (S160), the adjusting part 223 executes the adjusting process to lower the brightness values Y of the target pixels Pt as extracted (S172). According to the second illustrative embodiment, the adjusting part 223 executes the adjusting process which converts the brightness values Y of the target pixels Pt to the adjusted brightness values Ya according to formula F(7) indicated below. That is, the adjusting part 223 makes the brightness values Y of the target pixels Pt coincide with the lowest brightness value Y (i.e., the minimum value Ymin) among the brightness values Y within the letter area included in the image represented by the target image data IF.

$$Ya = Ymin \qquad F(7)$$

Thereafter, the statistical processing part 224 re-regenerates the histogram of the brightness values Y of the target image data IF (S182). At this stage, for the target pixels Pt among the pixels constituting the target image data IF, the adjusted brightness values Ya are used instead of the brightness values Y.

In contrast, when it is determined that no letters are included in the image represented by the target image data IF (i.e., when it is determined that the adjustment execution condition is not satisfied) (S153: NO), steps S154, S160, S172 and S182 described above are skipped.

Thereafter, as in the first illustrative embodiment, the first threshold value Th1 for binarizing process is set (S190) based on the generated histogram of the brightness values Y, and binarizing process using the first threshold value Th1 is applied to the target image data IF (S200).

As described above, in the binarizing process by the scanner 200 according to the second illustrative embodiment, the condition setting part 226 sets the adjustment execution condition, the condition determining part 227 determines whether the adjustment execution condition is satisfied, and the adjusting process (S172) is executed when it is determined that the adjustment execution condition is satisfied, while the adjusting process is not executed when it is determined that the adjustment execution condition is not satisfied.

Therefore, with the scanner 200 according to the second illustrative embodiment, when the adjustment execution condition is satisfied and the adjusting process is executed, it becomes possible to suppress occurrence of a situation where the letters and/or images to be retained disappear by the binarizing process and desired results cannot be obtained. Further, when the adjustment execution condition is not satisfied, it is possible to suppress a situation that unintended results are obtained due to execution of the adjusting process.

Specifically, in the binarizing process by the scanner 200 according to the second illustrative embodiment, the condition setting part 226 may set a condition that "the image represented by the target image data IF includes letters" as the adjustment execution condition. Therefore, it is possible to suppress occurrence of a situation where the letters in the image are inadvertently converted to the white pixels by the binarizing process and disappear. Further, it is also possible to suppress a situation where the adjusting process is executed when the image does not include letters and undesired results of the binarizing process are obtained.

In the binarizing process by the scanner 200 according to the second illustrative embodiment, the condition setting part 226 sets the adjustment execution condition based on at least one of the size of the target image data IF and the size of the original PA from which the target image data IF is generated. Therefore, according to the scanner 200, the adjustment execution condition can be appropriately set based on at least one of the size of the target image data IF and the size of the original PA from which the target image data IF is generated, and it is possible to effectively suppress occurrence of a situation where the desired results are not obtained in the binarizing process.

Further, in the binarizing process by the scanner 200 according to the second illustrative embodiment, the adjusting part 223 executes the adjusting process to convert the brightness values Y of the target pixels Pt to the lowest brightness value Ymin among the brightness values Y within the letter area included in the image represented by the target image data. Therefore, according to the scanner 200, a possibility to convert the pixels within the specific color range CR to the black pixels but not to the white pixels during the binarizing process can be further increased. Accordingly, it becomes possible to effectively suppress occurrence of a situation where letters and/or images to be retained disappear during the binarizing process.

C. Third Illustrative Embodiment

Figure 7:
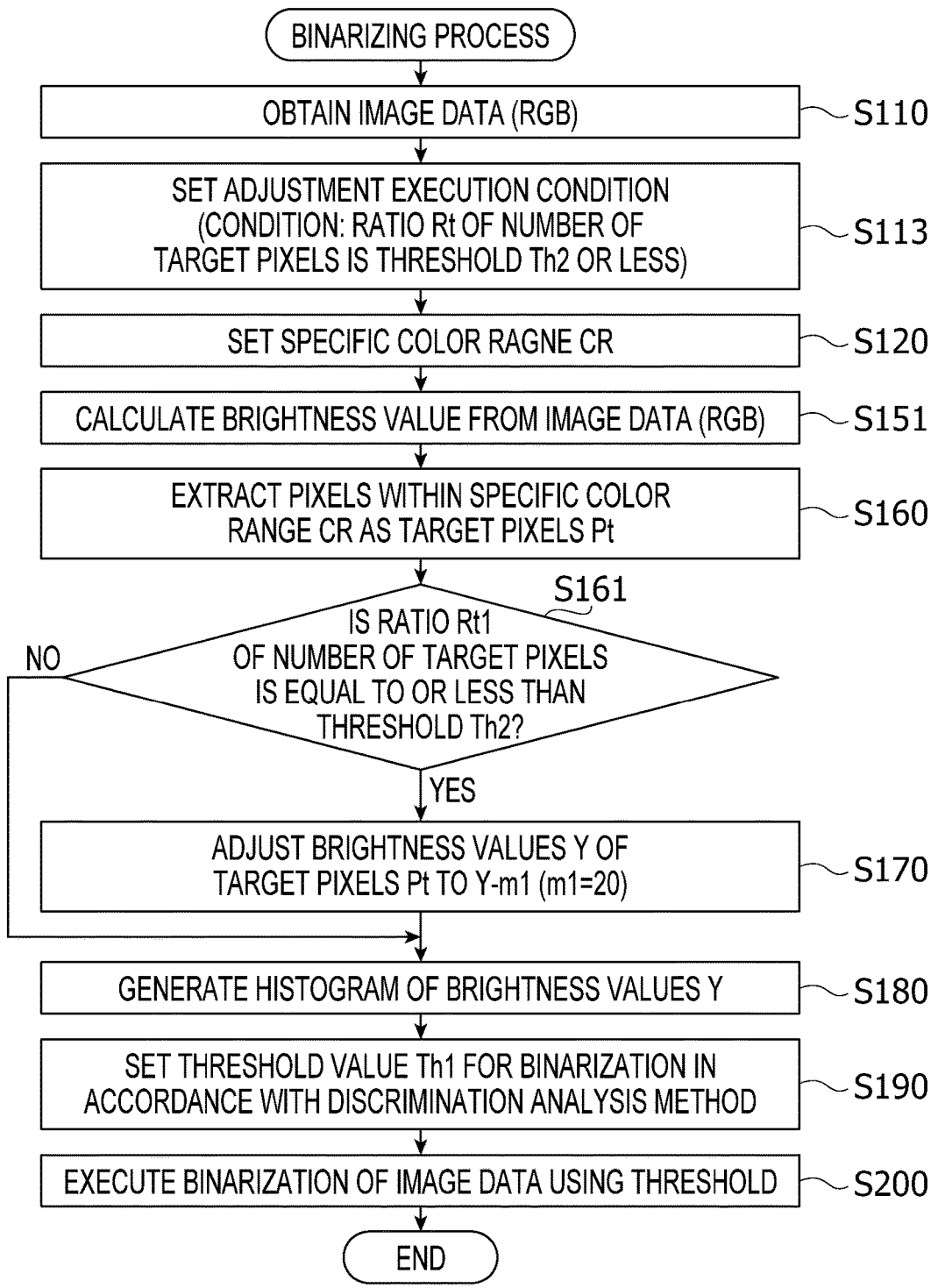
FIG. 7 is a flowchart illustrating a binarizing process according to a third illustrative embodiment of the disclosures.

FIG. 7 is a flowchart illustrating the binarizing process according to a third illustrative embodiment. In the following description, steps of the binarizing process according to the third illustrative embodiment which are similar to those of the binarizing process according to the first and/or the second illustrative embodiment are assigned with the same step numbers and description thereof will occasionally be omitted.

In the binarizing process according to the third illustrative embodiment, similar to the second illustrative embodiment, the condition setting part 226 (see FIG. 2) of the scanner 200 sets the adjustment execution condition (S113) after the target image data IF is obtained (S110). It is noted that, in the third illustrative embodiment, a condition "a ratio of the number of target pixels Pt to the number of the pixels constituting the target image data IF is equal to or less than a second threshold value Th2" is set as the adjustment execution condition. It is noted that the above ratio will be referred to as "target pixel ratio Rt" in the following description.

Next, as in the second illustrative embodiment, the specific color range CR is set (S120), the brightness value Y of each of the pixels is calculated based on the target image data IF (S151) and the target pixels Pt included within the specific color range CR are extracted (S160).

Next, the condition determining part 227 calculates the target pixel ratio Rt described above based on the extraction result of the target pixels Pt, and determines whether the target pixel ratio Rt is equal to or less than the second threshold value Th2 (i.e., whether the adjustment execution condition is satisfied) in S161.

When it is determined that the target pixel ratio Rt is equal to or less than the second threshold value Th2 (i.e., the adjustment execution condition is satisfied) (S161: YES), as in the first illustrative embodiment, the adjusting part 223 executes the adjusting process to reduce the brightness values Y of the target pixels Pt by the amount of constant m1 (S170). In contrast, when it is determined that the target pixel ratio Rt is greater than the second threshold value Th2 (i.e., the adjustment execution condition is not satisfied) (S161: NO), the adjusting process (S170) is skipped.

Thereafter, similar to the first illustrative embodiment, the histogram of the brightness values Y (or adjusted brightness values Ya) of the target image data IF is generated (S180), the first threshold value Th1 for the binarizing process is set (S190) based on the histogram of the brightness values Y as generated (S190), and the binarizing process is applied to the target image data IF with use of the first threshold value Th1 (S200).

As described above, in the binarizing process by the scanner 200 according to the third illustrative embodiment, the condition setting part 226 sets the adjustment execution condition, the condition determining part 227 determines whether the adjustment execution condition is satisfied, and the adjusting process (S170) is executed when it is determined that the adjustment execution condition is satisfied, while the adjusting process is not executed when it is determined that the adjustment execution condition is not satisfied.

Therefore, with the scanner 200 according to the third illustrative embodiment, when the adjustment execution condition is satisfied and the adjusting process is executed, it becomes possible to suppress occurrence of a situation where the letters and/or images to be retained disappear by the binarizing process and desired results cannot be obtained. Further, when the adjustment execution condition is not satisfied, it is possible to suppress a situation that unintended results are obtained due to execution of the adjusting process.

Specifically, in the binarizing process by the scanner 200 according to the third illustrative embodiment, the condition setting part 226 may set a condition that "the ratio of the number of target pixels Pt to the number of the pixels constituting the target image data IF is equal to or less than a second threshold value Th2" as the adjustment execution condition. When the target pixel ratio Rt is greater than the second threshold value Th2, that is, when the number of the target pixels Pt is relatively large, there is a possibility that the gourd color or the background of the image is included in the target pixels Pt. According to the third illustrative embodiment, when the target pixel ratio Rt is greater than the second threshold value Th2, the adjusting process is not executed. Therefore, it is possible to suppress a situation where the ground color pixels or background pixels are unintentionally converted to the black pixels during the binarizing process.

D. Fourth Illustrative Embodiment

Figure 8:
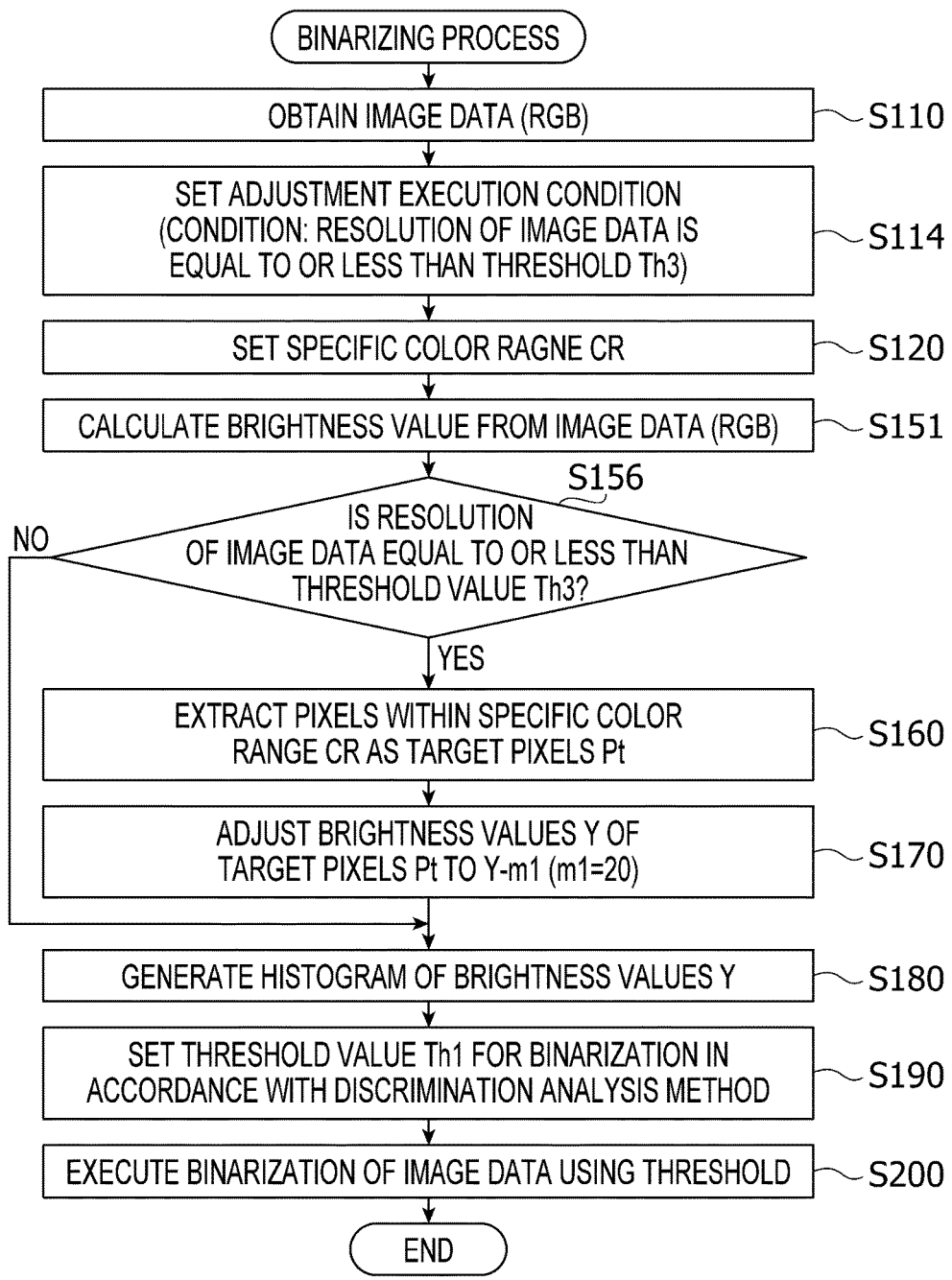
FIG. 8 is a flowchart illustrating a binarizing process according to a fourth illustrative embodiment of the disclosures.

FIG. 8 is a flowchart illustrating the binarizing process according to a fourth illustrative embodiment. In the following description, steps of the binarizing process according to the fourth illustrative embodiment which are similar to those of the binarizing process according to the first through third illustrative embodiments are assigned with the same step numbers and description thereof will occasionally be omitted.

In the binarizing process according to the fourth illustrative embodiment, similar to the second illustrative embodiment and the like, the condition setting part 226 (see FIG. 2) of the scanner 200 sets the adjustment execution condition (S114) after the target image data IF is obtained (S110). It is noted that, in the fourth illustrative embodiment, a condition "a resolution of the target image data IF is equal to or less than a third threshold value Th3" is set as the adjustment execution condition.

Next, as in the second illustrative embodiment and the like, the specific color range CR is set (S120), and the brightness value Y of each pixel is calculated based on the target image data IF (S151).

Next, the condition determining part 227 determines whether the resolution of the target image data IF is equal to or less than the third threshold value Th3 (i.e., whether the adjustment execution condition is satisfied) in S156. When the resolution of the target image data IF is equal to or less than the third threshold value Th3 (i.e., when the adjustment execution condition is satisfied) (S156: YES), the pixel extracting part 222 extracts the target pixels Pt included within the specific color range CR (S160), as in the third illustrative embodiment and the like, and the adjusting part 223 executes the adjusting process to reduce the brightness values Y of the target pixels Pt by the amount of constant m1 (S170). In contrast, when it is determined that the resolution of the target image data IF is higher than the third threshold value Th3 (i.e., when it is determined that the adjustment execution condition is not satisfied) (S156: NO), steps S160 and S170 described above are skipped.

Thereafter, similar to the third illustrative embodiment and the like, the histogram of the brightness values Y (or adjusted brightness values Ya) of the target image data IF is generated (S180), the first threshold value Th1 for the binarizing process is set (S190) based on the histogram of the brightness values Y as generated (S190), and the binarizing process is applied to the target image data IF with use of the first threshold value Th1 (S200).

As described above, in the binarizing process by the scanner 200 according to the fourth illustrative embodiment, the condition setting part 226 sets the adjustment execution condition, the condition determining part 227 determines whether the adjustment execution condition is satisfied, and the adjusting process (S170) is executed when it is determined that the adjustment execution condition is satisfied, while the adjusting process is not executed when it is determined that the adjustment execution condition is not satisfied.

Therefore, with the scanner 200 according to the fourth illustrative embodiment, when the adjustment execution condition is satisfied and the adjusting process is executed, it becomes possible to suppress occurrence of a situation where the letters and/or images to be retained disappear by the binarizing process and desired results cannot be obtained. Further, when the adjustment execution condition is not satisfied, it is possible to suppress a situation that unintended results are obtained due to execution of the adjusting process.

Specifically, in the binarizing process by the scanner 200 according to the fourth illustrative embodiment, the condition setting part 226 may set a condition that "the resolution of the target image data IF is equal to or less than the third threshold value Th3" as the adjustment execution condition. When the resolution of the target image data IF is equal to or less than the third threshold value Th3, that is when the resolution of the target image data is relatively low, it is likely to occur that the letters and/or images to be remained disappear by the binarizing process. According to the fourth illustrative embodiment, when the resolution of the target image data IF is equal to or less than the third threshold value Th3, the adjusting process is executed. Therefore, it becomes possible to effectively suppress occurrence of a situation where letters and/or images to be retained disappear during the binarizing process. Further, it is also possible to suppress a situation where the adjusting process is executed when the resolution of the target image data IF is relatively high and undesired results of the binarizing process are obtained.

D-1. Modification of Fourth Illustrative Embodiment

In the fourth illustrative embodiment, the condition setting part 226 sets a condition that "the resolution of the target image data IF is equal to or less than the third threshold value Th3" as the adjustment execution condition. It is noted that the adjustment condition need not be limited to the above condition. For example, a condition that "a compression rate of the target image data IF is equal to or greater than a fourth threshold value Th4" or "the size of the target image data IF is equal to or less than a fifth threshold value Th5" may be set as the adjustment condition. When the compression rate of the target image data IF is relatively high (i.e., equal to or greater than the fourth threshold value Th4), or when the size of the target image data IF is relatively small (i.e., equal to or less than the fifth threshold value Th5), it may likely occur that the letters or images to be retained may unintentionally disappear by the binarizing process. Therefore, by setting the adjustment execution condition as described above, it becomes possible to suppress occurrence of a situation where the adjusting process is executed when the compression rate of the target image data IF is relatively high or when the size of the target image data IF is relatively small, and the letters and/or images to be retained may unintentionally disappear.

E. Fifth Illustrative Embodiment

Figure 9:
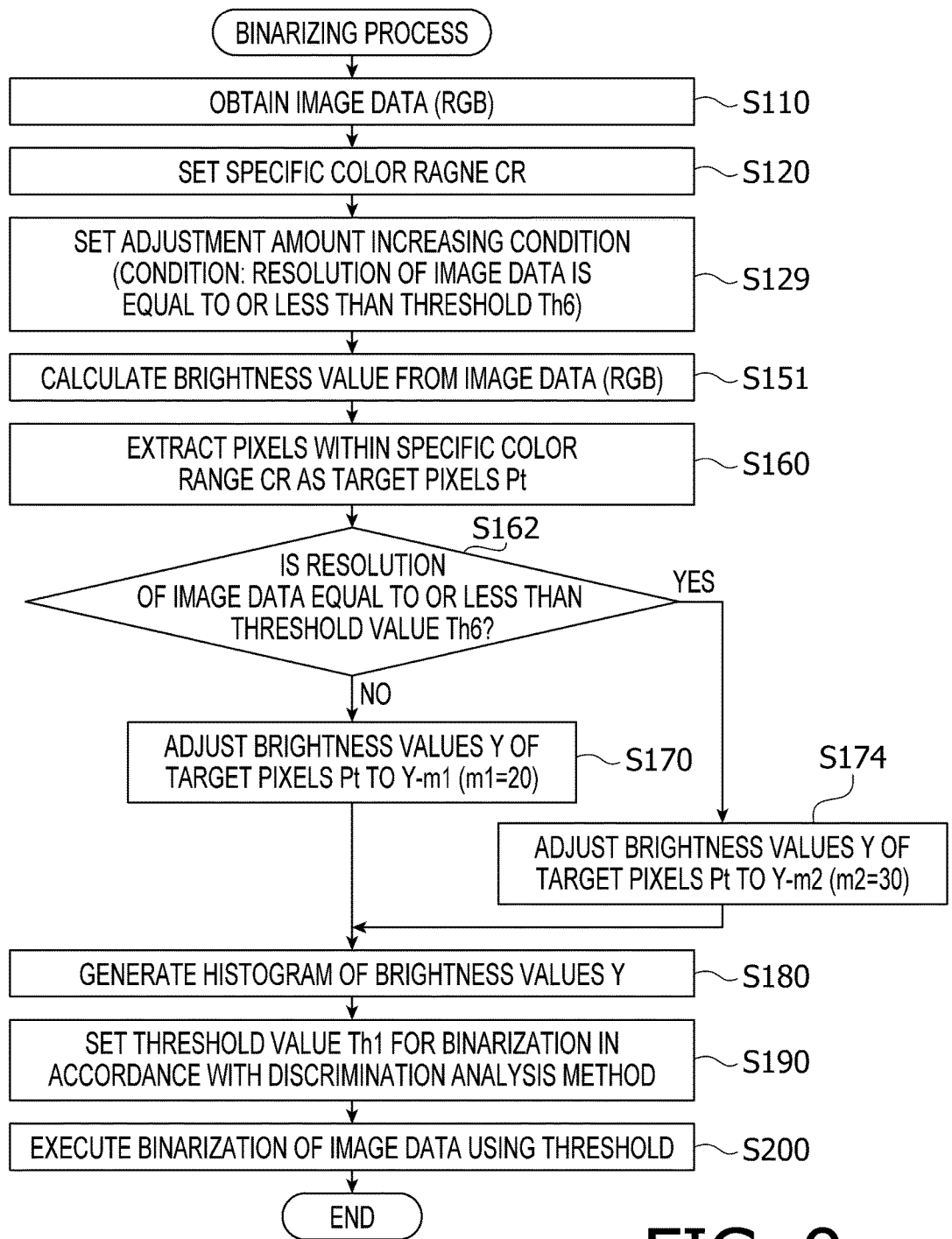
FIG. 9 is a flowchart illustrating a binarizing process according to a fifth illustrative embodiment of the disclosures.

FIG. 9 is a flowchart illustrating the binarizing process according to a fifth illustrative embodiment. In the following description, steps of the binarizing process according to the fifth illustrative embodiment which are similar to those of the binarizing process according to the first through fourth illustrative embodiments are assigned with the same step numbers and description thereof will occasionally be omitted.

In the binarizing process according to the fifth illustrative embodiment, similar to the first embodiment, the target image data IF is obtained (S110), and the specific color range CR is set (S120). Thereafter, the condition setting part 226 (see FIG. 2) of the scanner 200 sets the adjustment amount increasing condition (S129). The adjustment amount increasing condition is a condition used to determine whether a relatively large adjustment amount is set when the adjustment process (S170, S174) is applied to the target pixels Pt.

According to the fifth illustrative embodiment, the condition setting part 226 sets the adjustment amount increasing condition based on at least one of the size of the target image data IF and the size of the original PA from which the target image data IF is generated. For example, the condition setting part 226 may set a condition that "the resolution of the target image data IF is equal to or less than a sixth threshold value Th6" as the adjustment amount increasing condition when the size of the target image data IF or the size of the original PA from which the target image data IF is generated corresponds to particular sizes defined in advance as those of the payment slip or receipt. The following description will be made under assumption that the condition, "the resolution of the target image data IF is equal to or less than the sixth threshold value Th6" has been set.

Next, as in the third illustrative embodiment, the brightness value Y of each of the pixels is calculated based on the target image data IF (S151), the target pixels Pt included within the specific color range CR are extracted (S160), and the condition determining part 227 determines whether the resolution of the target image data IF is equal to or less than the sixth threshold value Th6 (i.e., whether the adjustment amount increasing condition is satisfied) in S162.

When it is determined that the resolution of the target image data IF is greater than the sixth threshold value Th6

(i.e., the adjustment amount increasing condition is not satisfied) (S162: NO), as in the third illustrative embodiment and the like, the adjusting part 223 executes the adjusting process to reduce the brightness values Y of the target pixels Pt by the amount of constant m1 (e.g., m1=20) (S170). In contrast, when it is determined that the resolution of the target image data IF is equal to or less than the sixth threshold value Th6 (i.e., the adjustment amount increasing condition is satisfied) (S162: YES), the adjusting part 223 executes the adjusting process to reduce the brightness values Y of the target pixels Pt by an amount of constant m2 which is greater than constant m1 (e.g., m2=30) in S174.

As described above, the adjustment amount (i.e., constant m2) for the adjusting process when the adjustment amount increasing condition is satisfied is greater than the adjustment amount (i.e., constant m1) for the adjusting process when the adjustment amount increasing condition is not satisfied.

Thereafter, similar to the third illustrative embodiment and the like, the histogram of the brightness values Y (or adjusted brightness values Ya) of the target image data IF is generated (S180), the first threshold value Th1 for the binarizing process is set (S190) based on the histogram of the brightness values Y as generated (S190), and the binarizing process is applied to the target image data IF with use of the first threshold value Th1 (S200).

As described above, in the binarizing process by the scanner 200 according to the fifth illustrative embodiment, the condition setting part 226 sets the adjustment amount increasing condition, the condition determining part 227 determines whether the adjustment amount increasing condition is satisfied, and the binarization processing part 220 sets the adjustment amount such that, the adjustment amount (i.e., constant m2) when it is determined that the adjustment amount increasing condition is satisfied is greater than the adjustment amount (i.e., constant m1) when it is determined that the adjustment amount increasing condition is not satisfied.

Therefore, with the scanner 200 according to the fifth embodiment, since the adjustment amount for the adjusting process is greater when the adjustment amount increasing condition is satisfied, it is possible to increase the adjustment amount when it is likely that the letters and images are unintentionally disappear, otherwise the adjustment amount can be reduced. Accordingly, it is possible to suppress occurrence of a situation where bad influence due to adjustment is suppressed but the desired results cannot be obtained.

Specifically, the scanner 200 according to the fifth illustrative embodiment is configured such that the condition setting part 226 set the condition "the resolution of the target image data IF is equal to or less than the sixth threshold value Th6" as the adjustment amount increasing condition. When the resolution of the target image data IF is equal to or less than the sixth threshold value Th6, that is, when the resolution of the target image data IF is relatively low, it is likely that a situation where the letters and/or images to be remained may unintentionally disappear by the binarizing process may occur.

With the scanner 200 according to the fifth illustrative embodiment, when the resolution of the target image data IF is equal to or less than the sixth threshold value Th6, the adjustment amount in the adjusting process is set to a relatively large amount. Therefore, it becomes possible to effectively suppress a situation where the letters and/or images are unintentionally disappear and desired results cannot be obtained. Further, since the scanner 200 according to the fifth illustrative embodiment is configured such that the adjustment amount for the adjusting process is set to a small value when the resolution of the target image data IF is relatively high. Therefore, it is also possible to suppress a situation where the adjusting process is executed with a relatively large adjustment amount when resolution of the target image data IF is relatively high, and undesired results of the binarizing process are obtained.

E-1. Modification of Fifth Illustrative Embodiment

According to the fifth illustrative embodiment, the condition "the resolution of the target image data is equal to or less than the sixth threshold" is set as the adjustment amount increasing condition. It is noted that the adjustment amount increasing condition need not be limited to the described one. For example, a condition "the compression rate of the target image data IF is equal to or greater than a seventh threshold value Th7" or "the size of the target image data IF is equal to or less than an eighth threshold value Th8" may be set.

When the compression rate of the target image data IF is relatively high (e.g., equal to or greater than the seventh threshold value Th7), or when the size of the target image data IF is relatively small (e.g., equal to or less than the eighth threshold value Th8), it may likely occur that the letters or images to be remained may unintentionally disappear. By setting the adjustment amount increasing condition, it becomes possible to increase the adjustment amount in the adjusting process when the compression rate of the target image data IF is relatively high or the size of the target image data IF is relatively small. Therefore, it becomes possible to effectively suppress occurrence of a situation where the letters and/or images unintentionally disappear and desired results cannot be obtained.

F. Other Modifications

It is noted that the technique disclosed in this specification need not be limited to those described above. Various types of modifications may be available without departing aspects of the disclosures. Further examples of such modifications may include configurations indicated below.

It is noted that the configuration of the image processing system 10 described above is only an example and the configuration can be modified in various ways. For example, the controller 210 of the scanner does not necessarily function as the removal processing part 230. Further, the binarization processing part 220 does not necessarily include functions of the condition setting part 226 and the condition determining part 227.

It is noted that the binarizing process according to each embodiment is only an example, and a part of steps can be omitted or modified. Further, an order of some of the steps of the binarizing process may be changed. For example, according to the above-described embodiments, the target image data IF is image data which is generated as the reading device 270 reads the original PA. Such a configuration may be modified such that the target image data IF may be the image data received from another equipment (e.g., the PC 100) through the communication I/F 260 or the like. Further, the target image data IF need not be limited to the RGB data, but could be any other type of image data expressed according to another color system or color space.

According to the above-described embodiments, the pixel extracting part 222 is configured to set the specific color range CR based on at least one of the size of the target image data IF and the size of the original PA from which the target image data IF is generated. This configuration may be modified such that a predetermined specific color range CR is set, or the specific color range CR designated through the operation panel 250 is set.

According to the above-described embodiments, the condition setting part 226 sets the adjustment execution condition or the adjustment amount increasing condition based on at least one of the size of the target image data IF and the size of the original PA from which the target image data IF is generated. This configuration may be modified such that a predetermined adjustment execution condition or a predetermined adjustment amount increasing condition is set, or the adjustment execution condition or the adjustment amount increasing condition instructed through the operation panel 25 may be set.

It is noted that the adjustment execution conditions described above are only examples, and can be modified in various ways. For example, the adjustment execution condition may be one coupling two or more adjustment execution conditions indicated above as examples with AND. Similarly, the adjustment amount increasing conditions described above are only examples, and can be modified in various ways. For example, the adjustment amount increasing condition may be one coupling two or more adjustment amount increasing conditions indicated above as examples with AND.

In the above-described illustrative embodiments, the discrimination analysis method known as Otsu method is employed as a method to set the first threshold value Th1 used in the binarizing process. It is noted that another method may be employed as far as the method is to set the first threshold value Th1 based on the histogram.

In the binarizing process described above, the histogram of the brightness value Y is used. This configuration may be modified such that a histogram of another index value (e.g., G component) representing the quantity of the brightness may be used.

In the above-described embodiments, whether the ground color removing process is to be executed or not is determined, and when it is determined that the ground color removing process is to be executed, the target pixels Pt are extracted after execution of the ground color removing process. It is noted that, when other removing processes such as a ruled line removing process, a punch hole removing process and the like (i.e., a process of converting gradation values of pixels corresponding to a particular removing color to a gradation value corresponding to the white color) are determined to be executed in addition to or instead of the ground color removing process, the target pixels Pt may be extracted after execution of the removing processes. Further, whether the removing processes are executed or not is not necessarily determined.

In the above-described embodiments, instead of the process to generate the YCbCr data from the target image data IF, a process to calculate the brightness value Y based on the target image data IF may be executed. Alternatively, in the above-described embodiments, instead of the process to calculate the brightness value Y based on the target image data IF, the process to generate the YCbCr data from the target image data IF may be executed.

In the above-described illustrative embodiments (except for the second illustrative embodiment), the adjusting process is a process to reduce the brightness values Y of the target pixels Pt by the amount of constant m1 (or m2). The configuration may be modified such that, as in the second embodiment, the brightness values Y of the target pixels Pt may be converted to the minimum brightness value Ymin. In contrast, in the second embodiment, the adjusting process is a process to convert the brightness values Y of the target pixels Pt to the minimum brightness value Ymin. This configuration may be modified such that, as in the other embodiments, the brightness values Y of the target pixels Pt may be reduced by the amount of constant m1 (or m2).

Alternatively, the illustrative embodiments described above may be modified such that the adjusting process reduces the brightness values Y of the target pixels Pt by multiplying a particular coefficient less than one (e.g., 0.8). Furthermore, the adjusting process is not necessarily a process to directly reduce the brightness values Y of the target pixels Pt. That is, the adjusting process may be a process to adjust the gradation value (e.g., the RGB values) other than the brightness values Y of the target pixels Pt so that the brightness values Y of the target pixels Pt are relatively reduced.

Further, in the above-described illustrative embodiments, as an example of definition of a range of a color close to the achromatic color, a method of defining a range satisfying formula F(6) ($Cb^2+Cr^2<k3$) is indicated. It is only an example, and other methods of definition may be employed. For example, given that the maximum component being Imax and the minimum component being Imin among the R, G and B components, a range satisfying formula F(8) below may be defined as the rage of a color close to the achromatic color.

$$(Imax-Imin)/Imax<k4 \qquad F(8)$$

where k4 is a constant.

In the above-described illustrative embodiments, as an example of a definition method to define the blue color range, a method of defining a range satisfying formula F(1) (B−G>k1, and G−R>k2) is employed. It is only an example and other methods of defining the range may be employed. For example, the range satisfying formula F(9) or F(10) below may be defined as the blue color range.

$$R^2+G^2+(B-128)^2<k5 \qquad F(9)$$

where, k5 is a constant (e.g., k5=4096).

$$Cb>128, \text{ and } |a \tan((Cr-128)/(Cb-128))|<k6 \times n \qquad F(10)$$

where, k6 is a constant (e.g., k6=0.2).

In the above-described illustrative embodiment, examples in which the blue color range, or the range of the color close to the achromatic color is set as the specific color range CR are described. It is noted that, as the specific color range CR, a range of another color (e.g., red) may be set. When the red color range is set, the range may be defined by formula F(11) or F(12) below.

$$(R-128)^2+G^2+B^2<k7 \qquad F(11)$$

where, k7 is a constant (e.g., k7=4096).

$$Cb>128, \text{ and } |a \tan((Cb-128)/(Cr-128))|<k8 \times n \qquad F(12)$$

where, k8 is a constant (e.g., k8=0.2).

In the above-described illustrative embodiments, the binarizing process is executed by the scanner 200. The configuration may be modified such that the binarizing process is executed by another image processing device (e.g., the PC 100, not-shown printer, or the like). For example, the binarizing process may be executed by the CPU 112 in accordance with a scanner driver or another application program stored in the storage 114 of the PC 100.

In the above-described illustrative embodiments, a part of the configuration realized by hardware may be replaced with software. Further, in the above-described illustrative embodiments, a part of the configuration realized by software may be replaced with hardware.

What is claimed is:

1. An image processing apparatus, comprising:
a storage configured to store image data representing a color image, the image data being constituted by multiple pixels, each of the multiple pixels having a gradation value; and
a controller,
wherein the controller is configured to:
extract pixels, from among the multiple pixels, within a specific color range as target pixels;
adjust the gradation values of the target pixels such that brightness values of the target pixels are lowered;
generate a histogram of index values corresponding to quantities of the brightness values of the multiple pixels constituting the image data after the gradation values of the target pixels are adjusted;
set a threshold value based on the histogram as generated; and
apply a binarizing process to the image data using the threshold value.

2. The image processing apparatus according to claim 1, wherein the controller is further configured to:
extract letters from the color image; and
adjust the gradation values of the target pixels so that the brightness values of the target pixels become equal to the lowest brightness value among the brightness values within a range of the letters extracted from the color image.

3. The image processing apparatus according to claim 1, wherein the controller is further configured to adjust the gradation values of the target pixels so that the brightness values of the target pixels become reduced values which are calculated by subtracting a particular constant from the brightness values before being adjusted.

4. The image processing apparatus according to claim 1, wherein the controller is further configured to adjust the gradation values of the target pixels so that the brightness values of the target pixels become multiplied values which are calculated by multiplying a particular coefficient smaller than one to the brightness values before being adjusted.

5. The image processing apparatus according to claim 1, wherein the controller is further configured to:
determine whether a particular condition is satisfied; and
adjust the gradation values of the target pixels when it is determined that the particular condition is satisfied, wherein the gradation values of the target pixels are not adjusted when it is determined that the particular condition is not satisfied.

6. The image processing apparatus according to claim 5, wherein the controller is further configured to extract letters from the color image, and
wherein the particular condition includes a condition that the color image includes the letters.

7. The image processing apparatus according to claim 6, wherein the particular condition includes a condition that a ratio of a number of the target pixels to a number of the multiple pixels constituting the image data is equal to or less than a ratio threshold value.

8. The image processing apparatus according to claim 5, wherein the particular condition includes a condition that a resolution of the image data is equal to or less than a resolution threshold value.

9. The image processing apparatus according to claim 5, wherein the particular condition includes a condition that a compression rate of the image data is equal to or greater than a compression rate threshold value.

10. The image processing apparatus according to claim 5, wherein the particular condition includes a condition that a size of the image data is equal to or less than a size threshold value.

11. The image processing apparatus according to claim 5, wherein the controller is further configured to set the particular condition based on one of a size of the image data and a size of an original from which the image data is generated by scanning.

12. The image processing apparatus according to claim 1, wherein the controller is further configured to:
determine whether a particular condition is satisfied; and
set an adjusting amount of the gradation values of the target pixels such that the adjusting amount when it is determined that the particular condition is satisfied is greater than the adjusting amount when it is determined that the particular condition is not satisfied.

13. The image processing apparatus according to claim 12, wherein the particular condition includes a condition that a resolution of the image data is equal to or less than a resolution threshold value.

14. The image processing apparatus according to claim 12, wherein the particular condition includes a condition that a compression rate of the image data is equal to or greater than a compression rate threshold value.

15. The image processing apparatus according to claim 12, wherein the particular condition includes a condition that a size of the image data is equal to or less than a size threshold value.

16. The image processing apparatus according to claim 1, wherein the controller is further configured to set the specific color range based on one of a size of the image data and a size of an original from which the image data is generated by scanning.

17. The image processing apparatus according to claim 1, wherein the controller is further configured to:
convert the gradation values of pixels, from among the multiple pixels constituting the image data, corresponding to a particular removing color to a value corresponding to a white color; and
extract the target pixels from the image data after converting the gradation values of the pixels corresponding to the particular removing color to a value corresponding to the white color.

18. The image processing apparatus according to claim 1, wherein the specific color range is a color range within which indexes indicating quantities of saturation are equal to or less than indexes threshold value.

19. An image processing method for an image processing apparatus which includes a storage configured to store image data representing a color image, the image data being constituted by multiple pixels, each of the multiple pixels having a gradation value,
wherein the method comprising:
extracting pixels, from among the multiple pixels, within a specific color range as target pixels;
adjusting the gradation values of the target pixels such that brightness values of the target pixels are lowered;
generating a histogram of index values corresponding to quantities of the brightness values of the multiple pixels constituting the image data after the gradation values of the target pixels are adjusted;

setting a threshold value based on the histogram as generated; and applying a binarizing process to the image data using the threshold value.

* * * * *